(12) United States Patent
Guilbert et al.

(10) Patent No.: US 10,584,603 B2
(45) Date of Patent: Mar. 10, 2020

(54) COMPOSITE MATERIAL VANE WITH INTEGRATED AERODYNAMIC COVERING ELEMENT AND MANUFACTURING METHOD THEREOF

(71) Applicant: SAFRAN AIRCRAFT ENGINES, Paris (FR)

(72) Inventors: Virginie Guilbert, Corbeil Essone (FR); Xavier Durand, Maisons Alfort (FR); Lise Lacroix, Melun (FR)

(73) Assignee: Safran Aircraft Engines, Paris (FR)

( * ) Notice: Subject to any disclaimer, the term of this patent is extended or adjusted under 35 U.S.C. 154(b) by 670 days.

(21) Appl. No.: 15/239,647

(22) Filed: Aug. 17, 2016

(65) Prior Publication Data
US 2017/0051617 A1    Feb. 23, 2017

(30) Foreign Application Priority Data

Aug. 18, 2015 (FR) ...................... 15 57780

(51) Int. Cl.
*F01D 9/04* (2006.01)
*B29C 45/00* (2006.01)
(Continued)

(52) U.S. Cl.
CPC .......... *F01D 9/041* (2013.01); *B29C 45/0005* (2013.01); *B29C 70/24* (2013.01); *B29C 70/48* (2013.01); *B29C 70/545* (2013.01); *B29C 70/84* (2013.01); *F01D 5/282* (2013.01); *B29K 2277/00* (2013.01); *B29L 2031/08* (2013.01);
(Continued)

(58) Field of Classification Search
CPC combination set(s) only.
See application file for complete search history.

(56) References Cited

U.S. PATENT DOCUMENTS

| 8,616,853 | B2 * | 12/2013 | Belmonte | ............... | B29B 11/16 |
| | | | | | 29/889.21 |
| 8,734,605 | B2 * | 5/2014 | Harrison | ............... | B29C 66/126 |
| | | | | | 156/242 |
| 2006/0032705 | A1 * | 2/2006 | Isham | ................... | B29C 43/003 |
| | | | | | 182/46 |

FOREIGN PATENT DOCUMENTS

| EP | 2 706 242 A1 | 3/2014 |
| FR | 2 740 380 A1 | 4/1997 |

(Continued)

OTHER PUBLICATIONS

INPI Search Report for corresponding application FR 1557780 dated Jun. 14, 2016 (3 pages).

*Primary Examiner* — Richard A Edgar
*Assistant Examiner* — Maxime M Adjagbe
(74) *Attorney, Agent, or Firm* — Bookoff McAndrews, PLLC (57) ABSTRACT

A method of manufacturing a composite material vane with a covering element, the vane including a platform and a profile extending perpendicularly to the platform, comprises the following steps: providing a covering element and a preform of the vane, the preform comprising a platform portion and a profile portion extending substantially perpendicularly to the platform portion; positioning the covering element against the platform portion so as to obtain an assembly; placing said assembly in a mold; injecting a first resin into the mold so that said resin impregnates and covers the preform and covers at least a portion of the covering element; and carrying out a heat treatment so as to harden the first resin.

20 Claims, 5 Drawing Sheets

(51) Int. Cl.
  *B29C 70/24* (2006.01)
  *F01D 5/28* (2006.01)
  *B29C 70/84* (2006.01)
  *B29C 70/54* (2006.01)
  *B29C 70/48* (2006.01)
  *B29K 277/00* (2006.01)
  *B29L 31/08* (2006.01)

(52) U.S. Cl.
  CPC ...... *F05D 2230/20* (2013.01); *F05D 2230/41* (2013.01); *F05D 2240/12* (2013.01); *F05D 2240/80* (2013.01); *F05D 2260/31* (2013.01); *F05D 2300/434* (2013.01); *F05D 2300/44* (2013.01); *F05D 2300/603* (2013.01); *F05D 2300/6012* (2013.01); *Y02T 50/672* (2013.01); *Y02T 50/673* (2013.01)

(56) References Cited

FOREIGN PATENT DOCUMENTS

| | | |
|---|---|---|
| FR | 2 958 980 A1 | 10/2011 |
| FR | 2 961 846 A1 | 12/2011 |
| WO | WO 2010/004216 A1 | 1/2010 |
| WO | WO 2014/076408 A1 | 5/2014 |

\* cited by examiner

COMPOSITE MATERIAL VANE WITH INTEGRATED AERODYNAMIC COVERING ELEMENT AND MANUFACTURING METHOD THEREOF

CROSS REFERENCE TO RELATED APPLICATIONS

This application claims priority under 35 U.S.C. § 119 to French Patent Application No. 1557780, filed Aug. 18, 2015, the contents of which are incorporated herein by reference.

FIELD OF THE INVENTION

The present disclosure relates to a flow straightener device for a turbomachine as well as a turbomachine equipped with such a flow straightener device.

It is recalled that "turbomachine" refers to any gas turbine apparatus producing propulsion energy, among which are distinguished in particular turbojets providing a thrust needed for propulsion from a reaction to the high speed ejection of hot gases, and turboshaft engines in which the propulsion energy is provided by the rotation of an engine shaft. For example, turboshaft engines are used as engines for helicopters, vessels, trains or as industrial engines. Turboprops (turboshafts driving a propeller) are also turboshafts used as airplane engines. It is also recalled that a flow straightener device is a device allowing straightening of the flow of air passing through the turbomachine in the flow direction.

TECHNOLOGICAL BACKGROUND

Document FR 2 958 980 describes an example of a known straightener device, comprising an annular body, vanes attached to the annular body and a platform positioned between each pair of adjoining vanes. Such a straightener device is generally heavy, which is harmful to the performance of the turbomachine. Moreover, the manufacture of the platform, as well as the mounting of the platform between each pair of adjoining vanes, are long and complex operations.

There exists, therefore, a need for a straightener device for a turbomachine which is lighter and whose manufacture and assembly are facilitated.

OBJECT AND SUMMARY OF THE INVENTION

The present invention aims to fulfill at least partially this need.

This goal is achieved thanks to a method for manufacturing a composite material vane with a covering element, the vane including a platform and a profile extending substantially perpendicularly to the platform, the method comprising the following steps:
  providing a covering element and a preform of the vane, the preform comprising a platform portion and a profile portion extending substantially perpendicularly to the platform portion;
  positioning the covering element against the platform portion so as to obtain an assembly;
  placing said assembly in a mold;
  injecting a first resin into the mold so that said resin impregnates and covers the preform and covers at least a portion of the covering element; and
  carrying out a heat treatment so as to harden the first resin.

In the present disclosure, a "covering element" designates a part or an assembly of parts which are provided for covering a part of the platform and constitute a cover for this part of the platform.

The method according to the invention makes it possible to obtain a composite material vane comprising a covering element; being on the surface of the vane and therefore delimiting the stream of fluid, this covering element therefore has an aerodynamic function. Because the vane is made of composite material, it is lighter than traditional vanes made of metal.

According to the invention, the first resin impregnates the preform while covering at least a portion of the covering element. Thus, after the heat treatment, the covering element is attached or bonded to the platform by the first resin. The first hardened resin provides at the same time the mechanical consolidation of the preform and the attachment of the covering element to the final vane. Thus, in a single operation of injection and heat treatment, a complete vane is obtained which is ready to be installed in the turbomachine. This results in simplification and time saving in the manufacture of the vane.

Moreover, to obtain the vane, it is no longer necessary to assemble several distinct elements together using supplementary elements such as screws or inserts. This results in an additional mass saving for the turbomachine, and the manufacture of the vane is simplified.

In addition, it is possible, if necessary, to easily modify the shape of the covering of the platform: indeed, it is sufficient to modify only the covering element. This is easier than modifying the shape of the preform, because the covering element has smaller dimensions than the preform and satisfies fewer design constraints than the preform does. It is even possible to obtain, if desired, composite vanes with the same shape as the existing metal vanes on a given turbomachine. Thus, it is possible to contemplate replacing one or more metal vanes in a given turbomachine with composite vanes having the same shape, resulting in a mass saving for the turbomachine.

According to one embodiment, the covering element is made of a material whose density is strictly lower than the density after the heat treatment of the composite material constituting the part of the platform which is located facing the covering element.

Thus, the composite material vane obtained by the method of the invention is lighter than a conventional composite vane in which the covering element is made of a single piece with, and of the same material as, the profile and the platform.

According to one embodiment, the covering element comprises at least two disjoint portions which, when the covering element is positioned against the platform portion, delimit a space through which the profile portion passes.

The assembly of the covering element onto the preform is thus simplified, because it is sufficient to bring the disjoint portions together so as to constitute the covering element, the profile portion then passing through the covering element.

Alternatively, the covering element is formed in a single piece and includes an opening through which the profile portion passes.

According to one embodiment, the platform portion comprises two opposite faces, and the covering element is positioned on the face of the platform portion positioned on the side of the profile portion.

Indeed, the face of the platform located on the side of the profile is less mechanically stressed than the other face, which must provide for the attachment of the platform to a part of the turbomachine. Moreover, the covering element being in contact with the stream of fluid passing along the platform, it is possible to provide the covering element with an aerodynamic shape selected to optimize the flow of the fluid.

According to one embodiment, after the heat treatment, a plurality of clamping through holes is machined in the platform and a plurality of passage through holes is machined in the covering element, each passage through hole being positioned facing a corresponding clamping through hole and having a diameter strictly greater than the diameter of the corresponding clamping through hole.

Alternatively, the covering element comprises a plurality of passage through holes and the platform portion comprises a plurality of clamping through holes, each passage through hole being positioned facing a corresponding clamping through hole and having a diameter strictly greater than the diameter of the corresponding clamping through hole, and, prior to injecting the first resin into the mold, each passage through hole and each clamping through hole is plugged.

Thus, the composite material vane may be attached to a part of the turbomachine using screws whose heads, after having passed through a passage through hole, rest on the platform made of composite material. With this configuration, only the composite material of the platform undergoes the mechanical stresses associated with the tightening of the screws, while the covering element is limited to its sole aerodynamical function. Thus, it is not necessary to select a material with great mechanical strength for the covering element; on the contrary, the covering element may be made of a low-strength, lightweight material, resulting in a mass saving for the vane.

According to one embodiment, the preform is a fibrous preform obtained by three-dimensional weaving.

"Three-dimensional weaving" refers to a weaving technique wherein weft threads circulate within a matrix of warp threads so as to form a three-dimensional network of threads in a three-dimensional weave: all the layers of threads of such a fiber structure are thus woven in the course of the same weaving step within a three-dimensional weaving loom. Techniques of this kind are now well known, and are for example described in document WO 2014/076408.

After hardening of the first resin, a vane is then obtained made of composite material which has numerous advantages within the context of a turbomachine (mass saving; reduced number of parts; simplified assembly and maintenance).

According to one embodiment, the first resin is a thermosetting resin.

According to one embodiment, the covering element consists of a composite material comprising a second thermoplastic resin.

This second resin is for example a polyetherimide resin.

Resins of this type have a low density, resulting in a mass saving compared to a conventional composite material vane. In addition, they have satisfactory heat resistance.

The method according to any one of the possibilities above may be applied, for example, to the manufacture of a composite vane for a straightener device for a turbomachine.

According to one embodiment, the provided preform comprises a tip platform portion formed on the end of the portion of the profile located on the opposite side of the platform portion.

According to one embodiment, after the covering element has been positioned against the platform portion, the end of the profile portion located on the side opposite to the platform portion is provided with attachment element portions.

The present invention also relates to a composite material vane for a turbomachine, comprising a preform impregnated with a first hardened resin and defining a platform and a profile extending substantially perpendicularly to the platform, wherein a covering element is attached to a platform portion by the first hardened resin and covered at least partially by said first hardened resin.

According to one embodiment, the covering element is made of a material whose density is strictly lower than the density of the composite material constituting the part of the platform which is located facing the covering element.

According to one embodiment, the covering element is formed from at least two disjoint portions which delimit a space through which the profile passes.

Alternatively, the covering element is formed in a single piece and includes an opening through which the profile passes.

According to one embodiment, the platform comprises two opposite faces, and the covering element is attached to the face of the platform positioned on the side of the profile.

According to one embodiment, the platform comprises a plurality of clamping through holes; the covering element comprises a plurality of passage through holes; and each passage through hole is positioned facing a corresponding clamping through hole and has a diameter strictly greater than the diameter of the corresponding clamping through hole.

According to one embodiment, the material constituting the covering element is a composite material comprising a thermoplastic resin.

This thermoplastic resin is for example a polyetherimide resin.

According to one embodiment, the vane further comprises a tip platform formed on the end of the profile located on the side opposite to the platform.

According to one embodiment, the vane further comprises an attachment element formed on the end of the profile located on the side opposite to the platform.

The tip platform or the at least one attachment element allow the vane to be attached to an element of the turbomachine located on the side opposite to the platform.

The composite material vane according to the invention provides all or part of the advantages mentioned above, which will therefore not be repeated.

The composite material vane may be, for example, a fixed vane for a straightener device of a turbomachine. The present invention also relates to a straightener device of a turbomachine equipped with such a fixed vane, as well as a turbomachine equipped with this straightener device.

BRIEF DESCRIPTION OF THE DRAWINGS

The invention will be well understood and its advantages will better appear upon reading the detailed description which follows of several embodiments, shown by way of non-limiting examples. The description refers to the appended drawings in which.

DETAILED DESCRIPTION OF THE INVENTION

Figure 1:
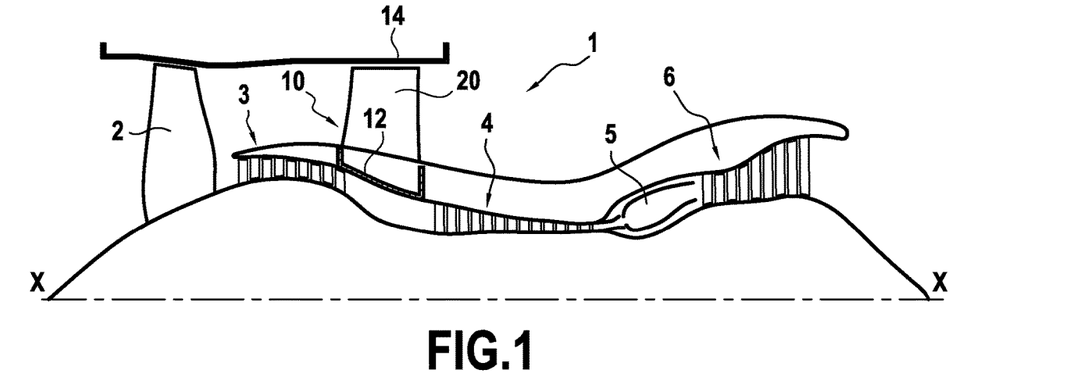
FIG. 1 is an axial half-section of a turbomachine which may incorporate a vane according to the invention.

The overall architecture of a turbomachine which may incorporate a vane according to the invention will be described in reference to FIG. 1, which shows an axial half-section of a turbomachine 1, whose main axis is designated X-X. Upstream, the turbomachine 1 comprises a fan 2 for admitting air. At the outlet of the fan 2, the air flow separates into two portions. A first portion of the air flow is sent into a low-pressure compressor 3, then into a high-pressure compressor 4. This first portion of the flow of air is then injected into a combustion chamber 5, and drives a turbine 6 at the outlet of the combustion chamber 5. A second portion of the air flow, at the outlet of the fan 2, is sent into a straightener device 10 to be straightened then mixed with gas leaving the turbine 6. The second portion of the air flow may be used in part for cooling the turbomachine 1.

More particularly, the straightener device 10 comprises a set of vanes 20 arranged radially between an inner annular body 12 and an outer annular body 14. These vanes 20 are sometimes called outlet guide vanes (OGV). In the present embodiment, the vanes 20 are made of composite material.

Figure 2:
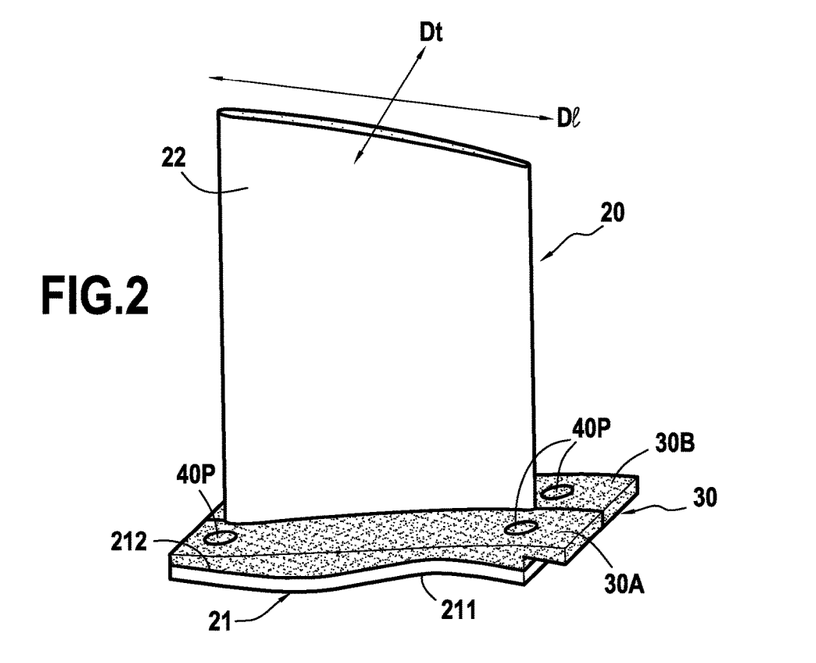
FIG. 2 is a view of a vane according to a first embodiment of the invention.

FIG. 2 shows in greater detail a composite material vane 20 according to a first embodiment of the invention. The vane 20 comprises a platform 21 and a profile 22 constituting the slender body of the vane 20 and having a profile suited to guide the flow of air within the straightener device 10. The profile 22 extends perpendicularly, or at least substantially perpendicularly, to the platform 21. The profile 22 has a longitudinal direction Dl and a transverse direction Dt perpendicular to the longitudinal direction Dl, and is substantially more elongated along the longitudinal direction Dl than in the transverse direction Dt. When the vane 20 is installed in the straightener 10 device, the longitudinal direction Dl coincides substantially with the direction of the axis X-X of the turbomachine 1.

The vane 20 is manufactured by injection and hardening of an impregnation and adhesion resin on a preform 120 defining the platform 21 and the profile 22, as will be detailed later. Hereafter and for convenience, the impregnation and adhesion resin will be called the "first resin."

The vane 20 is attached to the inner annular body 12 through the platform 21, as will be described in more detail later. The profile 22 may also have a tip platform (described later) located on the side of the profile 22 opposite to the platform 21, the tip platform attaching the vane to the outer annular body 14.

In a conventional vane, the profile and the face of the platform located on the side of the profile have a primarily aerodynamic function, i.e., they contribute mainly to guiding the second portion of the air flow through the straightener device 10. The mechanical strength of the vane is mainly ensured by the face of the platform located on the side opposite to the profile.

Figures 4A, 4B:
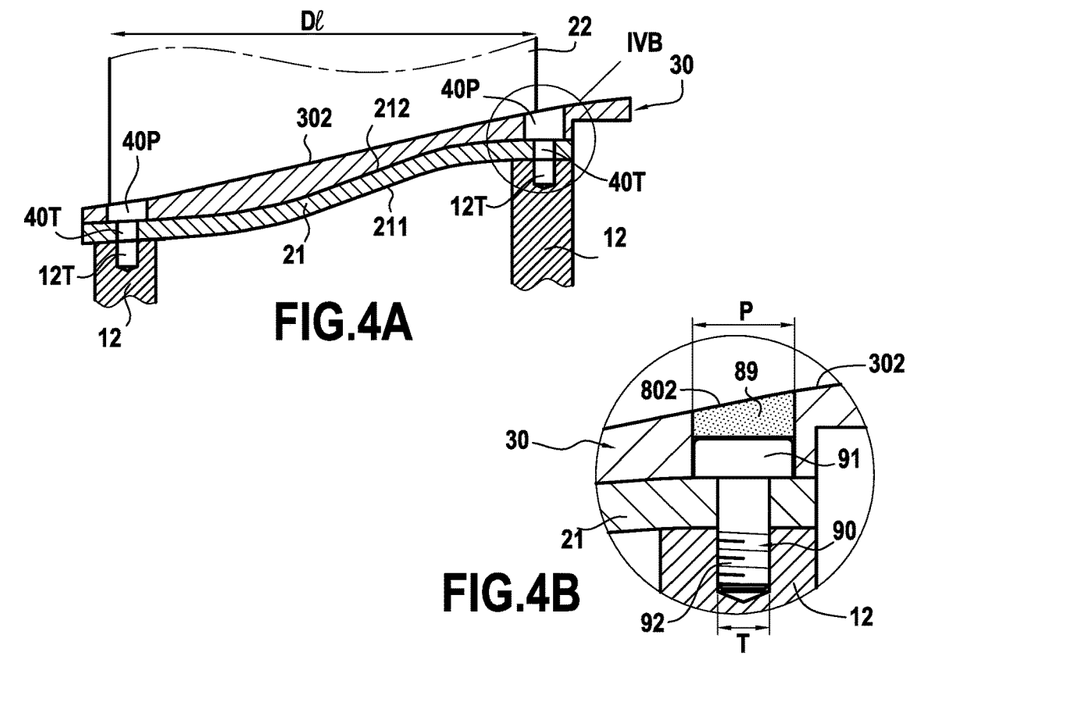
FIG. 4A is a section view of the vane according to the first embodiment of the invention.
FIG. 4B is a view of detail IVB of FIG. 4A.

According to the present invention, the face 212 of the platform 21 which is located on the side of the profile 22 comprises a covering element 30. The covering element 30 is attached to a platform portion 21 by the first hardened resin, and is covered at least partially by the first hardened resin. The covering element 30 covers at least a portion of the face 212 of the platform 21. Preferably, so as to reduce the mass of the vane 20, the covering element 30 is made of a material whose density is strictly lower than the density of the composite material constituting the part of the platform 21 which is located facing the covering element 30.

The expression "part of the platform 21 which is located facing the covering element 30" refers to the part of the platform 21 which is covered by the covering element 30 when the covering element 30 is installed on the vane 20. When the covering element 30 covers the entire face 212, the part of the platform 21 which is located facing the covering element 30 is the entire platform 21.

Figure 3A:
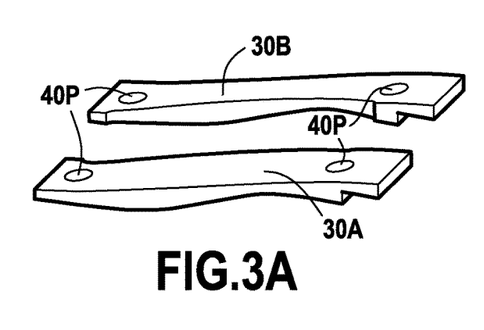
FIGS. 3A and 3B are views of a covering element of the vane according to the first embodiment of the invention.
Figure 3B:
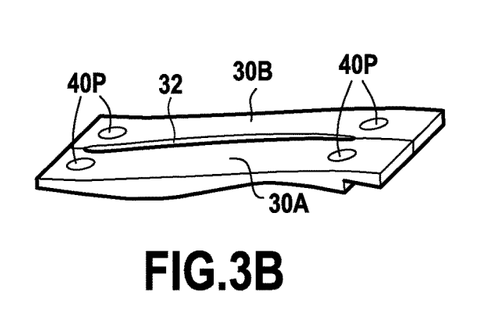

The covering element 30 may be formed from a plurality of disjoint portions which delimit a space or passage 32 through which the profile 22 passes. In the figures, a particular example has been shown in which the covering element 30 is formed from two disjoint portions 30A and 30B which are symmetrical with respect to one another. However, the covering element 30 may be constituted by more than two disjoint portions, and the disjoint portions are not necessarily symmetrical.

Alternatively, the covering element 30 is formed in a single piece including an opening through which the profile 22 passes. In this case, the covering element 30 may be slipped on the preform 120 which will be described later.

To provide for the attachment of the vane 20 to the inner annular body 12, the platform 21 and the covering element 30 are provided with a plurality of through holes.

More precisely, the platform 21 comprises a plurality of clamping through holes 40T, and the covering element comprises a plurality of passage through holes 40P. Within the meaning of the present disclosure, the fact that a hole in a part is called a "through hole" means that the hole passes through the entire thickness of that part.

Each passage through hole 40P is positioned facing a corresponding clamping through hole 40T. For example, the through holes 40P and 40T are circular, and each passage through hole 40P is coaxial with a corresponding clamping through hole 40T. It will be noted that the clamping through holes 40T and the passage through holes 40P have diameters that differ from one another.

Each passage through hole 40P has a diameter P that is strictly greater than the diameter T of the corresponding clamping through hole 40T. Thus, as is shown in more detail in FIG. 4B, a screw 90 comprising a head 91 and a shank 92 may pass through the through holes 40P and 40T so that the head 91 rests on the face 212 of the platform 21. Thus, the platform 21 undergoes the mechanical stresses associated with the tightening the screw 90, while the covering element 30, which does not undergo these mechanical stresses, may be made of a lighter material (i.e., having a lower density)

than the composite material constituting the platform 21. The thickness of the composite material platform 21 may thus be reduced to a minimum value.

Of course, the inner annular body 12 also comprises attachment holes 12T located facing the clamping through holes 40T so as to receive the shanks 92 of the screws 90 used to attach the vane 20.

After having assembled the vane 20 using the screws 90, masks 89, which consist for example of a resin, may be introduced into the passage through holes 40P. Preferably, the surface 802 of each mask located on the side of the profile 22 is at the same level and flush with the surface 302 of the covering element 30 located on the side of the profile 22. Thus the through holes 40T do not perturb the air flow in proximity to the covering element 30.

The covering element 30 is for example made of a second thermoplastic resin or a composite material containing a second thermoplastic resin, for example by injection molding.

For example, the second thermoplastic resin is a polyetherimide resin, which has in particular the advantage of having satisfactory heat resistance. One example of a composite material comprising a polyetherimide resin is a composite material called "Ultem" (registered trademark), which comprises a polyetherimide resin associated with 25 mass % of short carbon fibers; the polyetherimide resin is injected during manufacture of the covering element 30. The density of the "Ultem" composite material is on the order of 1350 kg/m$^3$. This density is strictly lower than that of the composite material constituting the platform 21 (on the order of 1500 kg/m$^3$) or of a metal (aluminium: 2800 kg/m$^3$). This results in a lightening of the vane 20.

A manufacturing method for the vane 20 according to the invention will now be described.

Figure 5:
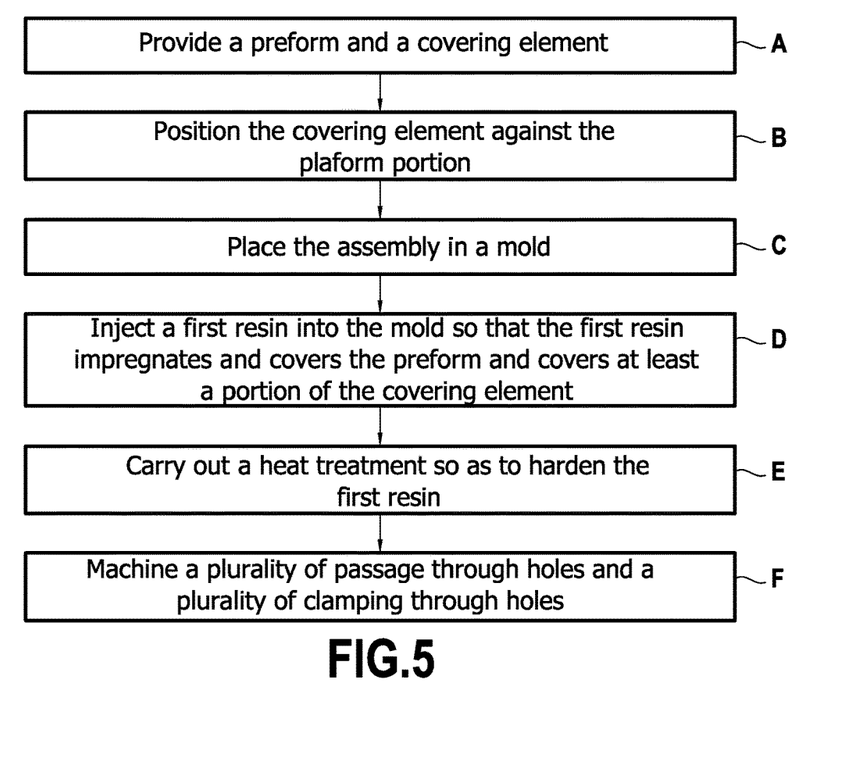
FIG. 5 is a block diagram of the steps of a method for manufacturing the vane according to the first embodiment of the invention.
Figure 6:
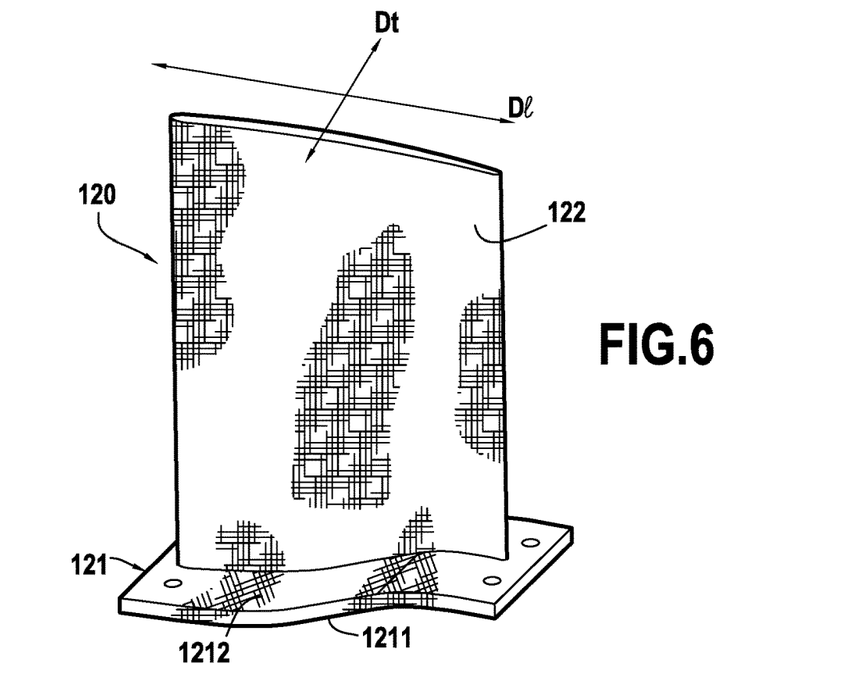
FIG. 6 is a view of a preform used for manufacturing the vane according to the first embodiment of the invention.

First of all, a preform 120 of the vane is provided, as well as the covering element 30 (step A).

The preform 120 comprises a platform portion 121 and a profile portion 122. After the step E which will be described below, the platform portion 121 results in the platform 21, and the profile portion 122 results in the profile 22.

The covering element 30 is then positioned against the platform portion 121 (step B). For example, the platform portion 121 comprises two faces 1211 and 1212 opposite one another, and the covering element 30 is positioned on the face 1212 positioned on the side of the profile portion 122.

If the covering element 30 consists of disjoint portions as has been described above, these disjoint portions are brought together so that they delimit a space 32 through which the profile portion 122 passes.

If the covering element 30 is formed from a single piece including the space 32, the covering element 30 is slipped on the end of the profile portion 122 which is opposite to the platform portion 121. In this case, the space 32 is dimensioned to facilitate manipulation of the covering element 30 during step B.

After step B, the assembly consisting of the preform 120 and the covering element 30 is placed in a mold (step C).

After step C, the first resin described above is injected into the mold, so that the first resin impregnates and covers the preform 120 and covers at least a portion of the covering element 30 (step D), then a heat treatment is carried out so as to harden the first resin (step E).

For example, the hardening of the first resin consists of polymerizing the first resin at least partially. Moreover, "heat treatment" designates any treatment during which the first resin is held sufficiently long at a sufficient temperature to cause hardening of the first resin.

After step E, the covering element 30 is attached to the vane 20 by the first hardened resin. It is not therefore necessary to screw or glue the covering element 30 to the vane 20, which results in a mass saving of the vane 20, and a simplification of the manufacture and the installation thereof in the straightener device 10.

The preform 120 may be a fibrous preform. For example, the preform 120 is obtained by three-dimensional weaving of fibers. As a variant, instead of such a three-dimensional weave, the preform 120 comprises at least one woven layer, also called a two-dimensional ply. When several layers are present, the preform may be called a drape. As a possible variant, the fibrous preform comprises at least one braid, for example in combination with an adjoining drape, this drape also optionally surrounding the braid.

The first resin impregnates the fibrous preform 120 by positioning itself in the interstices between the fibers. Thus, the composite material of the profile 22 and of the platform 21 results from the hardening of the first resin around the fibers of the preform 120. A composite material vane is thus obtained which has numerous advantages in the context of a turbomachine (mass saving, reduced number of parts; simplified assembly and maintenance). The first resin also provides for the attachment of the covering element 30 on the preform 120 in a single operation allowing excellent cohesion.

The first resin is for example a thermosetting resin, for example a formaldehyde-based thermosetting resin.

To form the through holes 40P and 40T described above, these through holes may be machined after the heat treatment (step F following step E).

As an alternative, the holes 40P and 40T may be formed respectively in the covering element 30 and in the preform 120, prior to step A. In this case, prior to step D, each of the through holes 40P and 40T is plugged. To do this, it is possible to use pins which may also serve to center the covering element 30 with respect to the preform 120. In this case, during step D, the centering pins determine the final edges of the through holes 40T.

The first resin and the second resin may be identical or different resins, provided that the density of the material constituting the covering element 30 is strictly lower than the density, after the heat treatment, of the composite material constituting the part of the platform 21 which is located facing the covering element 30.

The present invention is of course not limited to composite straightener device vanes, and may also be applied to other types of composite vanes.

Figure 7:
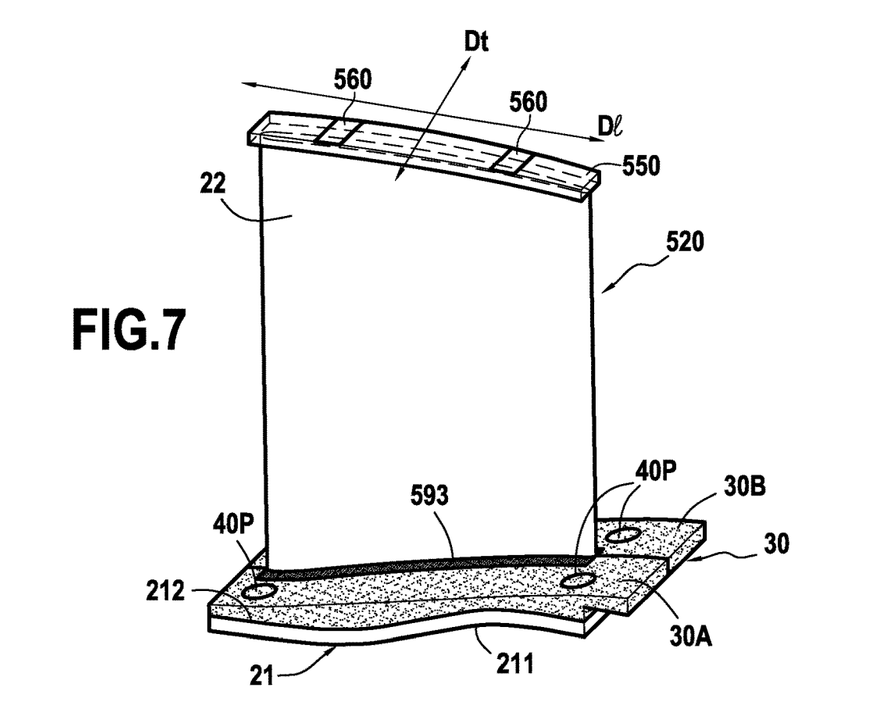
FIG. 7 is a view of a vane according to a second embodiment of the invention.
Figure 8:
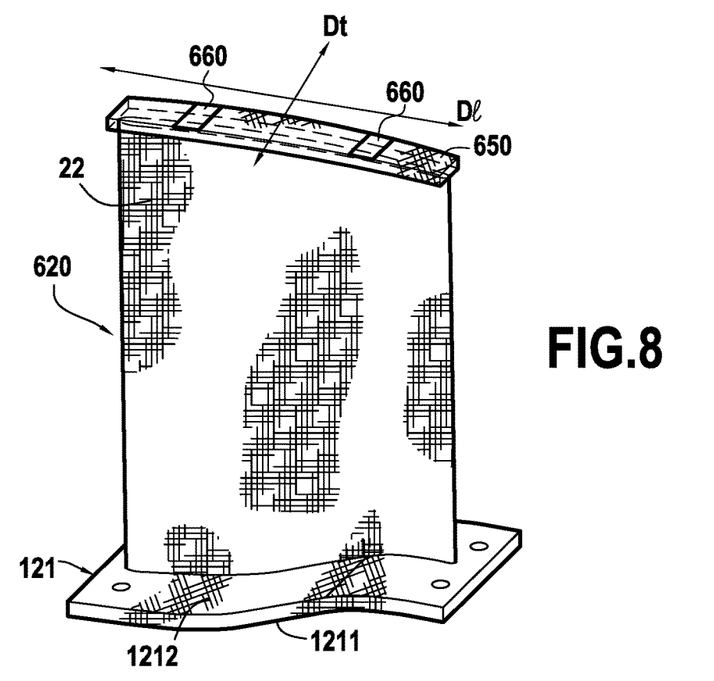
FIG. 8 is a view of a preform used in manufacturing the vane according to the second embodiment of the invention.

A composite material vane according to a second embodiment of the invention will now be described using FIGS. 7 and 8. Elements identical to the first embodiment are designated using the same numerical references and are not described again. Differing elements have numerical references which have been increased by 500.

The composite material vane 520 has a tip platform 550 on the end of the profile 22 located on the side opposite to the platform 21. The tip platform 550 extends along said end of the profile 22 and has a greater width (for example at least 2 times greater) than said end. Hereafter, the "width" of an element refers to the length of said element in the transverse direction Dt of the profile 22.

The tip platform 550 has attachment elements 560 to attach the vane 520 to the outer annular body 14. Thus, once installed in the turbomachine 1, the vane 520 is attached both to the inner annular body 12 and the outer annular body 14.

To obtain the vane 520, a preform 620 and the covering element 30 are provided, and the steps A to E described above are carried out.

The preform 620 is identical to the preform 120, except that it also comprises a tip platform portion 650 formed on the end of the profile portion 122, on the side opposite to the platform portion 121. The tip platform portion 650 extends along said end of the profile portion 122 and has a greater width (for example at least 2 times greater) than said end.

After step E, the tip platform portion 650 of the preform 620, after having been impregnated with resin and after the resin has hardened, forms the tip platform 550.

During step B, if the covering element 30 is formed from a single piece including a space 32 to allow the profile portion 122 to pass, this space 32 is of sufficient size to allow the tip platform portion 650 to pass through the space 32. During step D, the space 32 is filled by the first resin 593, which hardens during step E.

After step E, step F may be carried out.

The attachment elements 560 may be applied and attached to the vane after the step E consisting of hardening the first resin, or may be obtained from attachment element portions 660 provided on the tip platform portion 650.

As a variant of this embodiment, the preform 620 may be provided with two flaps formed on either side of the end of the profile portion 122, located on the side opposite to the platform portion 121, these two flaps initially being in the plane of the profile portion 122, instead of a tip platform portion 650 already formed.

During the step B of positioning the coverage element 30, the end of the profile portion 122 and the two flaps pass through the space 32. After step B and before step C, the two flaps are untied and folded down laterally, in other words they are moved from the plane of the profile portion 122 to a plane substantially in the direction Dt, so as to obtain the tip platform portion 650. The steps C to E (and optionally step F) are then carried out as described previously.

Figure 9:
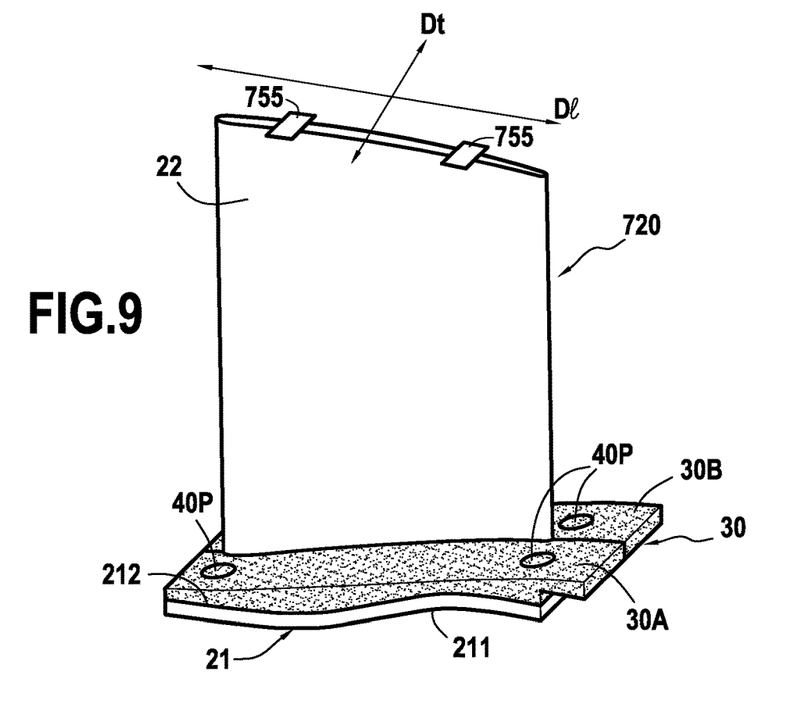
FIG. 9 is a view of a vane according to a third embodiment of the invention.
Figure 10:
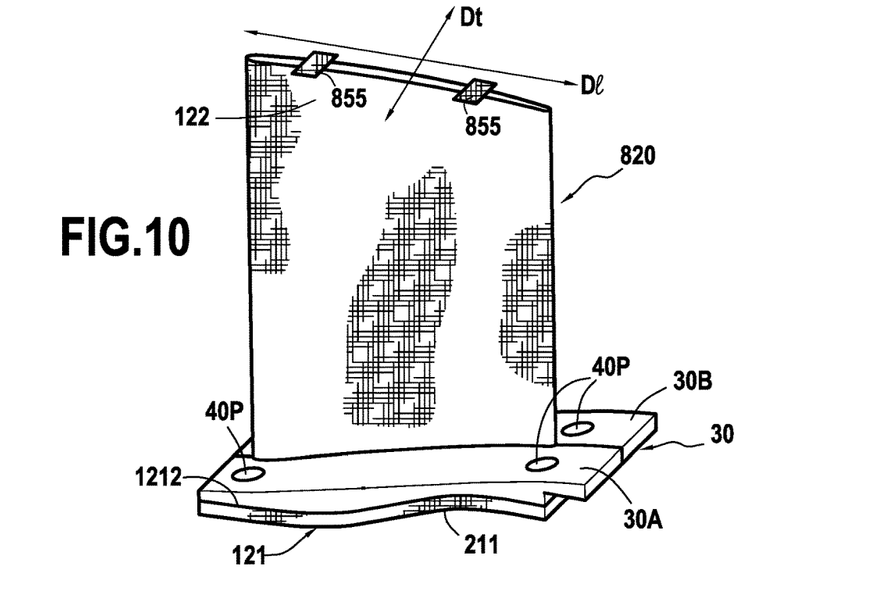
FIG. 10 is a view of a preform used for manufacturing the vane according to the third embodiment of the invention, a covering element being already installed on the preform.

A composite material vane according to a third embodiment will now be described using FIGS. 9 to 11. Elements identical to the first embodiment are designated by the same numerical references and are not described again. Differing elements have numerical references which have been increased by 700.

The composite material vane 720 has, on the end of the profile 22 opposite to the platform 21, one or more attachment elements 755. The attachment elements 755 are for example transverse tabs, which are discrete elements spaced over said end and having a greater width (for example at least 2 times greater) than said end. Here, "width" designates the dimension of the transverse tabs in the transverse direction Dt of the profile 22.

The attachment elements 755 provide for the attachment of the vane 720 to the outer annular body 14. Thus, once installed in the turbomachine 1, the vane 720 is attached both to the inner annular body 12 and to the outer annular body 14.

Figure 11:
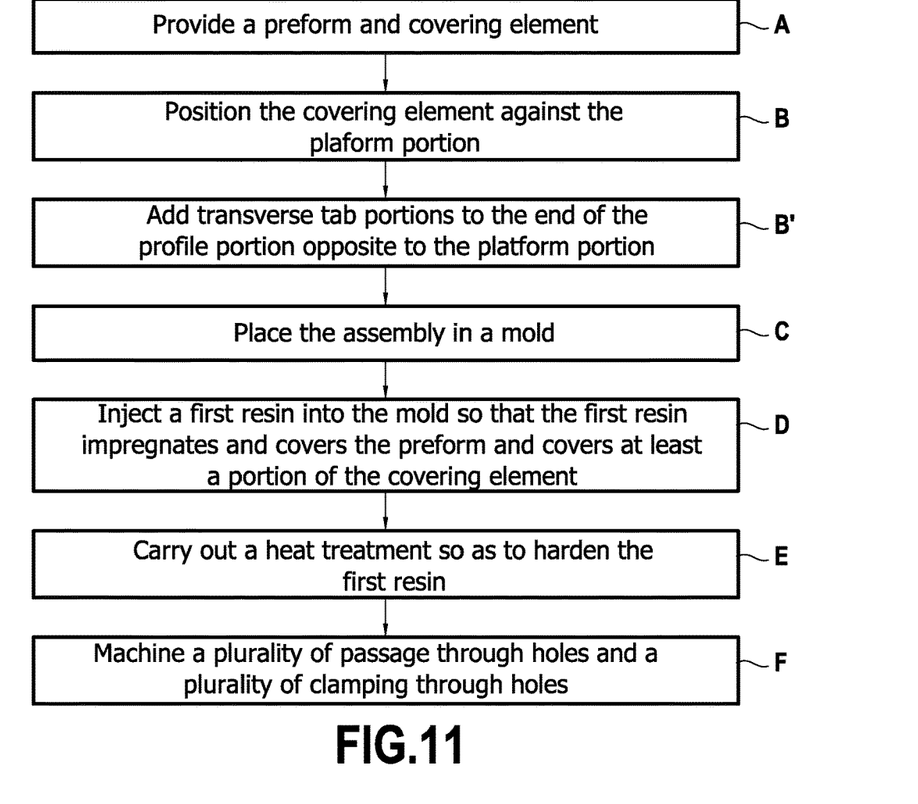
FIG. 11 is a block diagram of the steps of a method for manufacturing the vane according to the third embodiment of the invention.

To obtain the vane 720, a preform 820 and the covering element 30 are provided, and the steps of the method shown in FIG. 11 are followed.

First, step A is carried out, by providing the covering element 30 and the preform 820. The preform 820 is initially identical to the preform 120.

The covering element 30 is then positioned against the platform portion 121 (step B), as described above.

After step B, the end of the extrusion profile 122 located on the side opposite to the platform portion 121 is provided with attachment element portions 855 (step B'). To that end, attachment element portions 855 are added to the preform 820, or a portion of the preform 820 is formed so as to obtain the attachment element portions 855. When the preform 820 is a fibrous preform, the attachment element portions 855 are obtained by adding fibers of the same type as the fibers constituting the fibrous preform, or by folding fibers constituting the fibrous preform. After step B', the steps C to E described above are carried out, and optionally step F.

In the foregoing, a configuration where the vane is attached to the inner annular body 12 via the platform 21, and optionally to the outer annular body 14 through a tip platform or attachment elements, has been described. However, the vane may also be attached to the outer annular body 14 via the platform 21 and optionally to the inner annular body 12 via a tip platform or attachment elements.

Although the present invention has been described by referring to specific embodiments, it is clear that modifications and changes may be carried out on these examples without departing from the general scope of the invention as defined by the claims. In addition, individual features of the different embodiments mentioned may be combined in additional embodiments. Consequently, the description and the drawings are to be considered as illustrative rather than restrictive.

The invention claimed is:

1. A method of manufacturing a composite material vane with a covering element, the vane including a platform and a profile extending substantially perpendicularly to the platform, the method comprising the following steps:
   providing the covering element and a preform of the vane, the preform comprising a platform portion and a profile portion extending substantially perpendicularly to the platform portion;
   positioning the covering element against the platform portion so as to obtain an assembly;
   placing said assembly in a mold;
   injecting a first resin into the mold so that said resin impregnates and covers the preform and covers at least a portion of the covering element; and
   carrying out a heat treatment so as to harden the first resin, wherein the platform portion comprises two opposite faces and wherein the covering element is positioned on the face of the platform portion positioned on a side of the profile portion, and
   wherein the covering element comprises at least two disjoint portions which, when the covering element is positioned against the platform portion, delimit a space through which the profile portion passes.

2. The method according to claim 1, wherein the covering element is made of a material whose density is lower than the density, after the heat treatment, of the composite material constituting a part of the platform which is located facing the covering element.

3. The method according to claim 1, wherein, after the heat treatment, a plurality of clamping through holes is machined in the platform and a plurality of passage through holes is machined in the covering element, each passage through hole being positioned facing a corresponding clamping through hole and having a diameter greater than the diameter of the corresponding clamping through hole.

4. The method according to claim 1, wherein the covering element comprises a plurality of passage through holes and the platform portion comprises a plurality of clamping through holes, each passage through hole being positioned facing a corresponding clamping through hole and having a diameter greater than the diameter of the corresponding clamping through hole, and wherein, prior to injecting the first resin into the mold, each passage through hole and each clamping through hole is plugged.

5. The method according to claim 1, wherein the preform is a fibrous preform obtained by three-dimensional weaving.

6. The method according to claim 1, wherein the first resin is a thermosetting resin, and the covering element consists of a composite material comprising a second thermoplastic resin.

7. The method according to claim 6, wherein the second resin is a polyetherimide resin.

8. The method according to claim 1, wherein the preform of the vane comprises a tip platform portion formed on an end of the profile portion located on a side opposite to the platform portion.

9. The method according to claim 1, wherein, after the covering element has been positioned against the platform portion, an end of the profile portion located on a side opposite to the platform portion is provided with attachment element portions.

10. The method according to claim 1, wherein the covering element comprises exactly two disjoint portions.

11. The method according to claim 10, wherein the two disjoint portions are symmetrical.

12. A composite material vane, comprising a preform impregnated with a first hardened resin and defining a platform and a profile extending substantially perpendicularly to the platform, wherein a covering element is attached to a platform portion by the first hardened resin and covered at least partially by said first hardened resin, wherein the platform comprises two opposite faces, and
wherein the covering element is attached to the face of the platform positioned on the side of the profile, and
wherein the covering element is formed from at least two disjoint portions which delimit a space through which the profile passes.

13. The composite material vane according to claim 12, wherein the covering element is made of a material whose density is lower than the density of the composite material constituting the part of the platform which is located facing the covering element.

14. The composite material vane according to claim 12, wherein:
the platform comprises a plurality of clamping through holes;
the covering element comprises a plurality of passage through holes; and
each passage through hole is positioned facing a corresponding clamping through hole and has a diameter strictly greater than the diameter of the corresponding clamping through hole.

15. The composite material vane according to claim 12, wherein the material constituting the covering element is a composite material comprising a second resin, the second resin being a thermoplastic resin.

16. The composite material vane according to claim 15, wherein the second resin is a polyetherimide resin.

17. The composite material vane according to claim 12, further comprising a tip platform formed on the end of the profile located on the side opposite to the platform.

18. The composite material vane according to claim 12, further comprising at least one attachment element formed on the end of the profile located on the side opposite to the platform.

19. The composite material vane according to claim 12, wherein the covering element comprises exactly two disjoint portions.

20. The composite material vane according to claim 19, wherein the two disjoint portions are symmetrical.

* * * * *